US 6,742,021 B1

(12) United States Patent
Halverson et al.

(10) Patent No.: US 6,742,021 B1
(45) Date of Patent: May 25, 2004

(54) NAVIGATING NETWORK-BASED ELECTRONIC INFORMATION USING SPOKEN INPUT WITH MULTIMODAL ERROR FEEDBACK

(75) Inventors: Christine Halverson, San Jose, CA (US); Luc Julia, Menlo Park, CA (US); Dimitris Voutsas, Thessaloniki (GR); Aden J. Cheyer, Palo Alto, CA (US)

(73) Assignee: SRI International, Inc., Menlo Park, CA (US)

( * ) Notice: Subject to any disclaimer, the term of this patent is extended or adjusted under 35 U.S.C. 154(b) by 0 days.

(21) Appl. No.: 09/524,095

(22) Filed: Mar. 13, 2000

Related U.S. Application Data

(63) Continuation-in-part of application No. 09/225,198, filed on Jan. 5, 1999.
(60) Provisional application No. 60/124,718, filed on Mar. 17, 1999, provisional application No. 60/124,720, filed on Mar. 17, 1999, and provisional application No. 60/124,719, filed on Mar. 17, 1999.

(51) Int. Cl.[7] .............................................. G06F 15/16
(52) U.S. Cl. ............................. 709/218; 707/5; 707/4; 707/102
(58) Field of Search ................................ 709/218; 707/5, 707/4, 102; 704/257, 231

(56) References Cited

U.S. PATENT DOCUMENTS

| 5,197,005 A | 3/1993 | Schwartz et al. ............ 364/419 |
| 5,386,556 A | 1/1995 | Hedin et al. ................ 395/600 |

(List continued on next page.)

FOREIGN PATENT DOCUMENTS

| EP | 0 803 826 A2 | 10/1997 |
| WO | WO 00/11869 | 3/2000 |

OTHER PUBLICATIONS http://www.ai.sri.com/~lesaf/commandtalk.html: "CommandTalk: A Spoken–Language Interface for Battlefield Simulations", 1997, by Robert Moore, John Dowding, Harry Bratt, J. Mark Gawron, Yonael Gorfu and Adam Cheyer, in "Proceedings of the Fifth Conference on Applied Natural Language Processing", Washington, DC, pp. 1–7, Association for Computational Linguistics.

"The CommandTalk Spoken Dialogue System", 1999, by Amanda Stent, John Dowding, Jean Mark Gawron, Elizabeth Owen Bratt and Robert Moore, in "Proceedings of the Thirty–Seventh Annual Meeting of the ACL", pp. 183–190, University of Maryland, College Park, MD, Association for Computational Linguistics.

Stent, Amanda et al., "The CommandTalk Spoken Dialogue System", SRI International.

Moore, Robert et al., "CommandTalk: A Spoken–Language Interface for Battlefield Simulations", Oct. 23, 1997, SRI International.

Dowding, John et al., "Interpreting Language in Context in CommandTalk", Feb. 5, 1999, SRI International.

http://www.ai.sri.com/~oaa/infowiz.html, InfoWiz: An Animated Voice Interactive Information System, May 8, 2000.

(List continued on next page.)

Primary Examiner—James P. Trammell
Assistant Examiner—Firmin Backer
(74) Attorney, Agent, or Firm—Moser, Patterson & Sheridan, LLP.; Kin-Wah Tong, Esq.

(57) ABSTRACT

A system, method, and article of manufacture are provided for navigating an electronic data source by means of spoken language. When a spoken input request is received from a user, it is interpreted. Additional input is solicited from the user in a modality different than the original request and used to refine the navigation query. The resulting interpretation of the request is thereupon used to automatically construct an operational navigation query to retrieve the desired information from one or more electronic network data sources.

132 Claims, 7 Drawing Sheets

U.S. PATENT DOCUMENTS

| | | | |
|---|---|---|---|
| 5,434,777 A | 7/1995 | Luciw | 364/419 |
| 5,519,608 A | 5/1996 | Kupiec | 364/419.08 |
| 5,608,624 A | 3/1997 | Luciw | 395/794 |
| 5,721,938 A | 2/1998 | Stuckey | 395/754 |
| 5,729,659 A | 3/1998 | Potter | 395/2.79 |
| 5,748,974 A | 5/1998 | Johnson | 395/759 |
| 5,774,859 A | 6/1998 | Houser et al. | 704/275 |
| 5,794,050 A | 8/1998 | Dahlgren et al. | 395/708 |
| 5,802,526 A | 9/1998 | Fawcett et al. | 707/104 |
| 5,805,775 A | 9/1998 | Eberman et al. | 395/12 |
| 5,855,002 A | 12/1998 | Armstrong | 704/270 |
| 5,890,123 A | 3/1999 | Brown et al. | 704/275 |
| 5,963,940 A | 10/1999 | Liddy et al. | 707/5 |
| 6,003,072 A | 12/1999 | Gerritsen et al. | 709/218 |
| 6,012,030 A | 1/2000 | French-St. George et al. | 704/275 |
| 6,021,427 A | 1/2000 | Spagna et al. | |
| 6,026,388 A | 2/2000 | Liddy et al. | 707/1 |
| 6,080,202 A | 6/2000 | Strickland et al. | |
| 6,144,989 A | 11/2000 | Hodjat et al. | |
| 6,173,279 B1 * | 1/2001 | Levin et al. | 707/5 |
| 6,192,338 B1 * | 2/2001 | Zasto et al. | 704/257 |
| 6,226,666 B1 | 5/2001 | Chang et al. | |
| 6,338,081 B1 | 1/2002 | Furusawa et al. | |

OTHER PUBLICATIONS

Dowding, John, "Interleaving Syntax and Semantics in an Efficient Bottom–up Parser", SRI International.

Moore, Robert et al., "Combining Linguistic and Statistical Knowledge Sources in Natural–Language Processing for ATIS", SRI International.

Dowding, John et al., "Gemini: A Natural Language System For Spoken–Language Understanding", SRI International.

Moran, Douglas B. et al., "Intelligent Agent–based User Interfaces", Article Intelligence center, SRI International.

Martin, David L. et al., "Building Distributed Software Systems with the Open Agent Architecture".

Julia, Luc. et al., "Cooperative Agents and Recognition System (CARS) for Drivers and Passengers"; SRI International.

Moran, Douglas et al., "Multimodal User Interfaces in the Open Agent Architecture".

Cheyer, Adam et al., "Multimodal Maps: An Agent–based Approach", SRI International.

Cutkosky, Mark R. et al., "An Experiment in Integrating Concurrent Engineering Systems".

Martin, David et al., "Development Tools for the Open Agent Architecture", The Practical Application of Intelleigent Agents and Multi–Agent Technology (PAAM96), London, Apr. 1996.

Cheyer, Adam et al., "The Open Agent Architecture$_{tm}$", SRI International, AI center.

Dejima, Inc., http://www.dejima.com/.

Cohen, Philip et al., "An Open Agent Architecture", AAAI Spring Symposium, pp. 1–8, Mar. 1994.

Martin, David et al., "Information Brokering in an Agent Architecture", Proceeding of the $2^{nd}$ Int'l Conference on Practical Application of Intelligent Agents & Multi–Agent Technology, London, Apr. 1997.

* cited by examiner

NAVIGATING NETWORK-BASED ELECTRONIC INFORMATION USING SPOKEN INPUT WITH MULTIMODAL ERROR FEEDBACK

This is a Continuation In Part of co-pending U.S. patent application Ser. No. 09/225,198, filed Jan. 5, 1999, Provisional U.S. patent application Ser. No. 60/124,718, filed Mar. 17, 1999, Provisional U.S. patent application Ser. No. 60/124,720, filed Mar. 17, 1999, and Provisional U.S. patent application Ser. No. 60/124,719, filed Mar. 17, 1999, from which applications priority is claimed and these application are incorporated herein by reference.

BACKGROUND OF THE INVENTION

The present invention relates generally to the navigation of electronic data by means of spoken natural language requests, and to feedback mechanisms and methods for resolving the errors and ambiguities that may be associated with such requests.

As global electronic connectivity continues to grow, and the universe of electronic data potentially available to users continues to expand, there is a growing need for information navigation technology that allows relatively naïve users to navigate and access desired data by means of natural language input. In many of the most important markets—including the home entertainment arena, as well as mobile computing—spoken natural language input is highly desirable, if not ideal. As just one example, the proliferation of high-bandwidth communications infrastructure for the home entertainment market (cable, satellite, broadband) enables delivery of movies-on-demand and other interactive multimedia content to the consumer's home television set. For users to take full advantage of this content stream ultimately requires interactive navigation of content databases in a manner that is too complex for user-friendly selection by means of a traditional remote-control clicker. Allowing spoken natural language requests as the input modality for rapidly searching and accessing desired content is an important objective for a successful consumer entertainment product in a context offering a dizzying range of database content choices. As further examples, this same need to drive navigation of (and transaction with) relatively complex data warehouses using spoken natural language requests applies equally to surfing the Internet/Web or other networks for general information, multimedia content, or e-commerce transactions.

In general, the existing navigational systems for browsing electronic databases and data warehouses (search engines, menus, etc.), have been designed without navigation via spoken natural language as a specific goal. So today's world is full of existing electronic data navigation systems that do not assume browsing via natural spoken commands, but rather assume text and mouse-click inputs (or in the case of TV remote controls, even less). Simply recognizing voice commands within an extremely limited vocabulary and grammar—the spoken equivalent of button/click input (e.g., speaking "channel 5" selects TV channel 5)—is really not sufficient by itself to satisfy the objectives described above. In order to deliver a true "win" for users, the voice-driven front-end must accept spoken natural language input in a manner that is intuitive to users. For example, the front-end should not require learning a highly specialized command language or format. More fundamentally, the front-end must allow users to speak directly in terms of what the user ultimately wants —e.g., "I'd like to see a Western film directed by Clint Eastwood"—as opposed to speaking in terms of arbitrary navigation structures (e.g., hierarchical layers of menus, commands, etc.) that are essentially artifacts reflecting constraints of the pre-existing text/click navigation system. At the same time, the front-end must recognize and accommodate the reality that a stream of naive spoken natural language input will, over time, typically present a variety of errors and/or ambiguities: e.g., garbled/unrecognized words (did the user say "Eastwood" or "Easter"?) and under-constrained requests ("Show me the Clint Eastwood movie"). An approach is needed for handling and resolving such errors and ambiguities in a rapid, user-friendly, non-frustrating manner.

What is needed is a methodology and apparatus for rapidly constructing a voice-driven front-end atop an existing, non-voice data navigation system, whereby users can interact by means of intuitive natural language input not strictly conforming to the step-by-step browsing architecture of the existing navigation system, and wherein any errors or ambiguities in user input are rapidly and conveniently resolved. The solution to this need should be compatible with the constraints of a multi-user, distributed environment such as the Internet/Web or a proprietary high-bandwidth content delivery network; a solution contemplating one-at-a-time user interactions at a single location is insufficient, for example.

SUMMARY OF THE INVENTION

The present invention addresses the above needs by providing a system, method, and article of manufacture for navigating network-based electronic data sources in response to spoken input requests. When a spoken input request is received from a user, it is interpreted, such as by using a speech recognition engine to extract speech data from acoustic voice signals, and using a language parser to linguistically parse the speech data. The interpretation of the spoken request can be performed on a computing device locally with the user or remotely from the user. The resulting interpretation of the request is thereupon used to automatically construct an operational navigation query to retrieve the desired information from one or more electronic network data sources, which is then transmitted to a client device of the user. If the network data source is a database, the navigation query is constructed in the format of a database query language.

Typically, errors or ambiguities emerge in the interpretation of the spoken request, such that the system cannot instantiate a complete, valid navigational template. This is to be expected occasionally, and one preferred aspect of the invention is the ability to handle such errors and ambiguities in relatively graceful and user-friendly manner. Instead of simply rejecting such input and defaulting to traditional input modes or simply asking the user to try again, a preferred embodiment of the present invention seeks to converge rapidly toward instantiation of a valid navigational template by soliciting additional clarification from the user as necessary, either before or after a navigation of the data source, via multimodal input, i.e., by means of menu selection or other input modalities including and in addition to spoken input. This clarifying, multi-modal dialogue takes advantage of whatever partial navigational information has been gleaned from the initial interpretation of the user's spoken request. This clarification process continues until the system converges toward an adequately instantiated navigational template, which is in turn used to navigate the network-based data and retrieve the user's desired information. The retrieved information is transmitted across the network and presented to the user on a suitable client display device.

In a further aspect of the present invention, the construction of the navigation query includes extracting an input template for an online scripted interface to the data source and using the input template to construct the navigation query. The extraction of the input template can include dynamically scraping the online scripted interface.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

1. System Architecture
a. Server-End Processing of Spoken Input

Figure 1A:
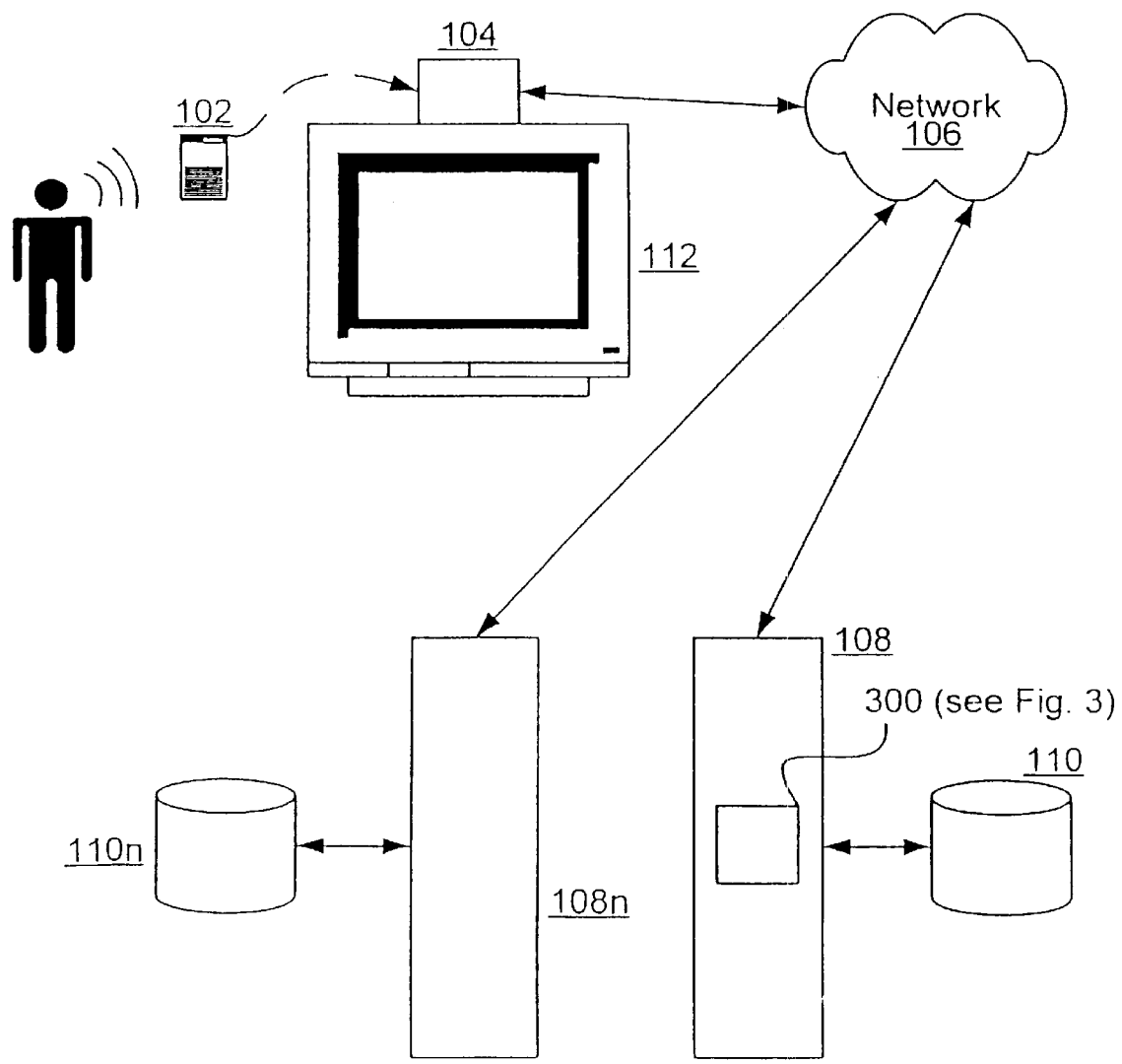
FIG. 1a illustrates a system providing a spoken natural language interface for network-based information navigation, in accordance with an embodiment of the present invention with server-side processing of requests.

FIG. 1a is an illustration of a data navigation system driven by spoken natural language input, in accordance with one embodiment of the present invention. As shown, a user's voice input data is captured by a voice input device 102, such as a microphone. Preferably voice input device 102 includes a button or the like that can be pressed or held-down to activate a listening mode, so that the system need not continually pay attention to, or be confused by, irrelevant background noise. In one preferred embodiment well-suited for the home entertainment setting, voice input device 102 is a portable remote control device with an integrated microphone, and the voice data is transmitted from device 102 preferably via infrared (or other wireless) link to communications box 104 (e.g., a set-top box or a similar communications device that is capable of retransmitting the raw voice data and/or processing the voice data) local to the user's environment and coupled to communications network 106. The voice data is then transmitted across network 106 to a remote server or servers 108. The voice data may preferably be transmitted in compressed digitized form, or alternatively—particularly where bandwidth constraints are significant—in analog format (e.g., via frequency modulated transmission), in the latter case being digitized upon arrival at remote server 108.

Figure 3:
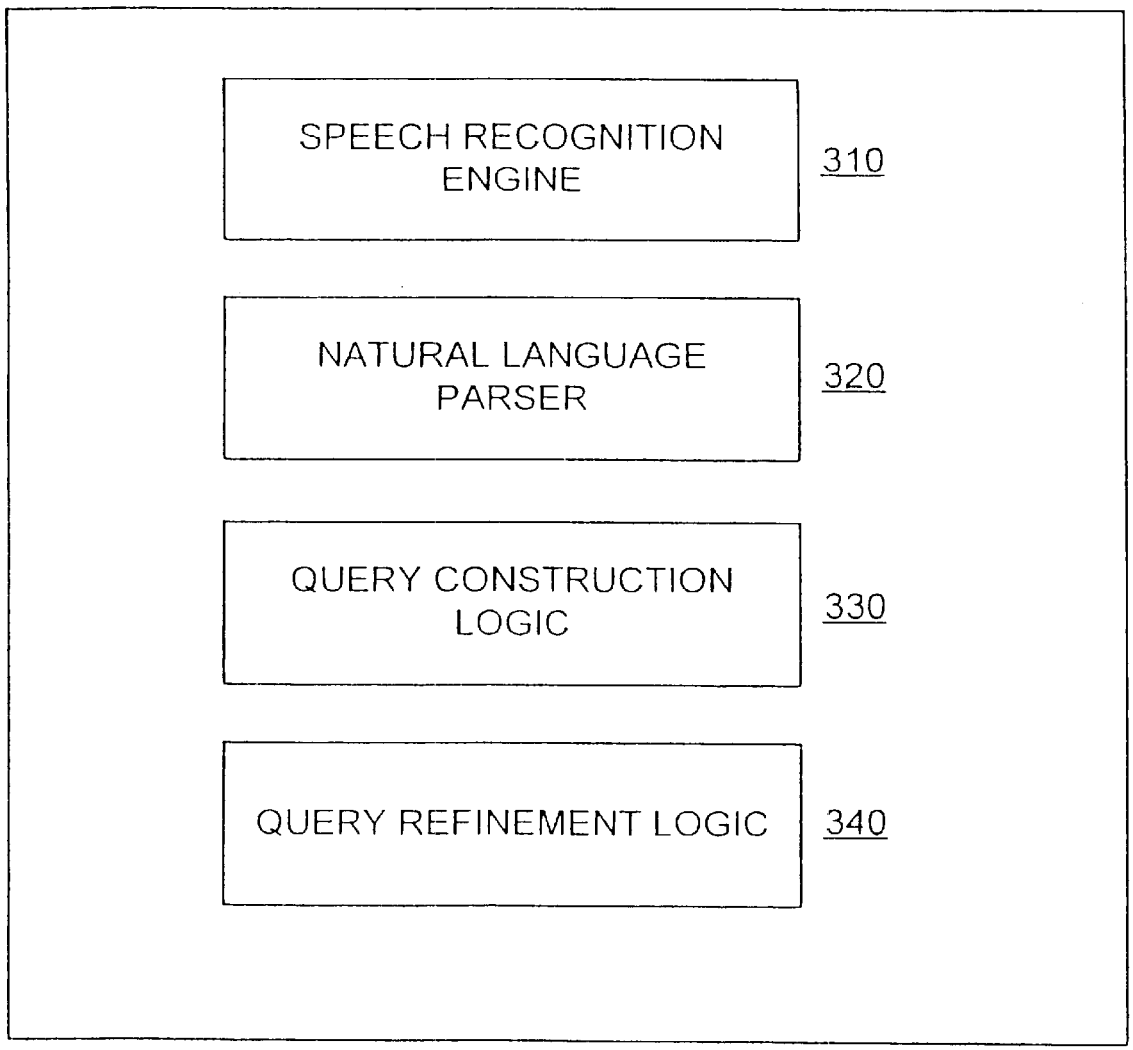
FIG. 3 illustrates the functional logic components of a request processing module in accordance with an embodiment of the present invention.

At remote server 108, the voice data is processed by request processing logic 300 in order to understand the user's request and construct an appropriate query or request for navigation of remote data source 110, in accordance with the interpretation process exemplified in FIG. 4 and FIG. 5 and discussed in greater detail below. For purposes of executing this process, request processing logic 300 comprises functional modules including speech recognition engine 310, natural language (NL) parser 320, query construction logic 330, and query refinement logic 340, as shown in FIG. 3. Data source 110 may comprise database(s), Internet/web site(s), or other electronic information repositories, and preferably resides on a central server or servers—which may or may not be the same as server 108, depending on the storage and bandwidth needs of the application and the resources available to the practitioner. Data source 110 may include multimedia content, such as movies or other digital video and audio content, other various forms of entertainment data, or other electronic information. The contents of data source 110 are navigated—i.e., the contents are accessed and searched, for retrieval of the particular information desired by the user—using the processes of FIGS. 4 and 5 as described in greater detail below.

Once the desired information has been retrieved from data source 110, it is electronically transmitted via network 106 to the user for viewing on client display device 112. In a preferred embodiment well-suited for the home entertainment setting, display device 112 is a television monitor or similar audiovisual entertainment device, typically in stationary position for comfortable viewing by users. In addition, in such preferred embodiment, display device 112 is coupled to or integrated with a communications box (which is preferably the same as communications box 104, but may also be a separate unit) for receiving and decoding/formatting the desired electronic information that is received across communications network 106.

Network 106 is a two-way electronic communications network and may be embodied in electronic communication infrastructure including coaxial (cable television) lines, DSL, fiber-optic cable, traditional copper wire (twisted pair), or any other type of hardwired connection. Network 106 may also include a wireless connection such as a satellite-based connection, cellular connection, or other type of wireless connection. Network 106 may be part of the Internet and may support TCP/IP communications, or may be embodied in a proprietary network, or in any other electronic communications network infrastructure, whether packet-switched or connection-oriented. A design consideration is that network 106 preferably provide suitable bandwidth depending upon the nature of the content anticipated for the desired application.

b. Client-End Processing of Spoken Input

Figure 1B:
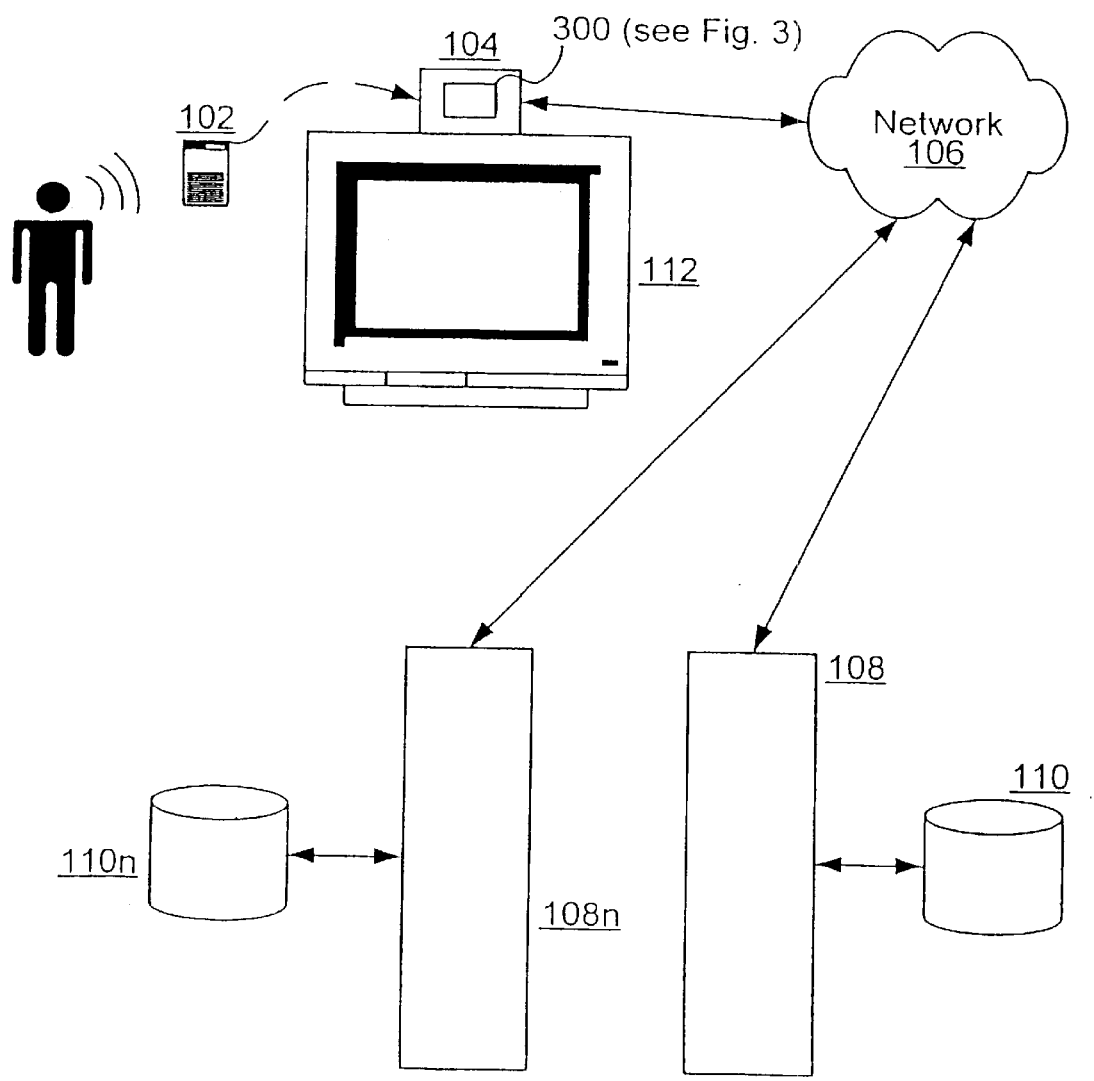
FIG. 1b illustrates another system providing a spoken natural language interface for network-based information navigation, in accordance with an embodiment of the present invention with client-side processing of requests.

FIG. 1b is an illustration of a data navigation system driven by spoken natural language input, in accordance with a second embodiment of the present invention. Again, a user's voice input data is captured by a voice input device 102, such as a microphone. In the embodiment shown in FIG. 1b, the voice data is transmitted from device 202 to requests processing logic 300, hosted on a local speech processor, for processing and interpretation. In the preferred embodiment illustrated in FIG. 1b, the local speech processor is conveniently integrated as part of communications box 104, although implementation in a physically separate (but communicatively coupled) unit is also possible as will be readily apparent to those of skill in the art. The voice data is processed by the components of request processing logic 300 in order to understand the user's request and construct an appropriate query or request for navigation of remote data source 110, in accordance with the interpretation process exemplified in FIGS. 4 and 5 as discussed in greater detail below.

The resulting navigational query is then transmitted electronically across network 106 to data source 110, which preferably resides on a central server or servers 108. As in FIG. 1a, data source 110 may comprise database(s), Internet/web site(s), or other electronic information repositories, and preferably may include multimedia content, such as movies or other digital video and audio content, other various forms of entertainment data, or other electronic information. The contents of data source 110 are then navigated—i.e., the contents are accessed and searched, for retrieval of the particular information desired by the user—preferably using the process of FIGS. 4 and 5 as described in greater detail below. Once the desired information has been retrieved from data source 110, it is electronically transmitted via network 106 to the user for viewing on client display device 112.

In one embodiment in accordance with FIG. 1b and well-suited for the home entertainment setting, voice input device 102 is a portable remote control device with an integrated microphone, and the voice data is transmitted from device 102 preferably via infrared (or other wireless) link to the local speech processor. The local speech processor is coupled to communications network 106, and also preferably to client display device 112 (especially for purposes of query refinement transmissions, as discussed below in connection with FIG. 4, step 412), and preferably may be integrated within or coupled to communications box 104. In addition, especially for purposes of a home entertainment application, display device 112 is preferably a television monitor or similar audiovisual entertainment device, typically in stationary position for comfortable viewing by users. In addition, in such preferred embodiment, display device 112 is coupled to a communications box (which is preferably the same as communications box 104, but may also be a physically separate unit) for receiving and decoding/formatting the desired electronic information that is received across communications network 106.

Design considerations favoring server-side processing and interpretation of spoken input requests, as exemplified in FIG. 1a, include minimizing the need to distribute costly computational hardware and software to all client users in order to perform speech and language processing. Design considerations favoring client-side processing, as exemplified in FIG. 1b, include minimizing the quantity of data sent upstream across the network from each client, as the speech recognition is performed before transmission across the network and only the query data and/or request needs to be sent, thus reducing the upstream bandwidth requirements.

c. Mobile Client Embodiment

Figure 2:
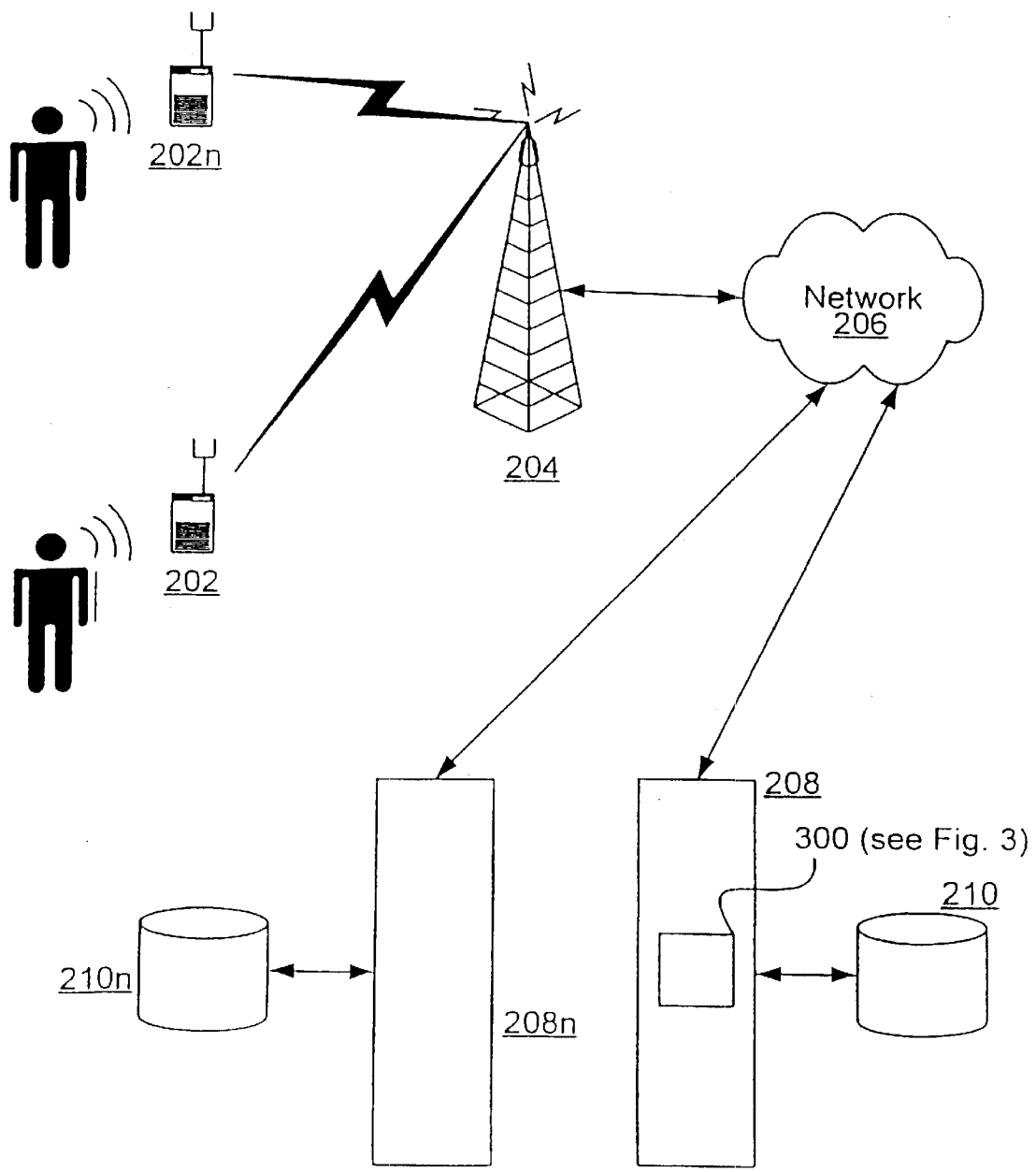
FIG. 2 illustrates a system providing a spoken natural language interface for network-based information navigation, in accordance with an embodiment of the present invention for a mobile computing scenario.

A mobile computing embodiment of the present invention may be implemented by practitioners as a variation on the embodiments of either FIG. 1a or FIG. 1b. For example, as depicted in FIG. 2, a mobile variation in accordance with the server-side processing architecture illustrated in FIG. 1 a may be implemented by replacing voice input device 102, communications box 104, and client display device 112, with an integrated, mobile, information appliance 202 such as a cellular telephone or wireless personal digital assistant (wireless PDA). Mobile information appliance 202 essentially performs the functions of the replaced components. Thus, mobile information appliance 202 receives spoken natural language input requests from the user in the form of voice data, and transmits that data (preferably via wireless data receiving station 204) across communications network 206 for server-side interpretation of the request, in similar fashion as described above in connection with FIG. 1. Navigation of data source 210 and retrieval of desired information likewise proceeds in an analogous manner as described above. Display information transmitted electronically back to the user across network 206 is displayed for the user on the display of information appliance 202, and audio information is output through the appliance's speakers.

Practitioners will further appreciate, in light of the above teachings, that if mobile information appliance 202 is equipped with sufficient computational processing power, then a mobile variation of the client-side architecture exemplified in FIG. 2 may similarly be implemented. In that case, the modules corresponding to request processing logic 300 would be embodied locally in the computational resources of mobile information appliance 202, and the logical flow of data would otherwise follow in a manner analogous to that previously described in connection with FIG. 1b.

As illustrated in FIG. 2, multiple users, each having their own client input device, may issue requests, simultaneously or otherwise, for navigation of data source 210. This is equally true (though not explicitly drawn) for the embodiments depicted in FIGS. 1a and 1b. Data source 210 (or 100), being a network accessible information resource, has typically already been constructed to support access requests from simultaneous multiple network users, as known by practitioners of ordinary skill in the art. In the case of server-side speech processing, as exemplified in FIGS. 1a and 2, the interpretation logic and error correction logic modules are also preferably designed and implemented to support queuing and multi-tasking of requests from multiple simultaneous network users, as will be appreciated by those of skill in the art.

It will be apparent to those skilled in the art that additional implementations, permutations and combinations of the embodiments set forth in FIGS. 1a, 1b, and 2 may be created without straying from the scope and spirit of the present invention. For example, practitioners will understand, in light of the above teachings and design considerations, that it is possible to divide and allocate the functional components of request processing logic 300 between client and server. For example, speech recognition—in entirety, or perhaps just early stages such as feature extraction—might be performed locally on the client end, perhaps to reduce bandwidth requirements, while natural language parsing and other necessary processing might be performed upstream on the server end, so that more extensive computational power need not be distributed locally to each client. In that case, corresponding portions of request processing logic 300, such as speech recognition engine 310 or portions thereof, would reside locally at the client as in FIG. 1b, while other component modules would be hosted at the server end as in FIGS. 1a and 2.

Further, practitioners may choose to implement the each of the various embodiments described above on any number of different hardware and software computing platforms and environments and various combinations thereof, including, by way of just a few examples: a general-purpose hardware microprocessor such as the Intel Pentium series; operating system software such as Microsoft Windows/CE, Palm OS, or Apple Mac OS (particularly for client devices and client-side processing), or Unix, Linux, or Windows/NT (the latter three particularly for network data servers and server-side processing), and/or proprietary information access platforms such as Microsoft's WebTV or the Diva Systems video-on-demand system.

2. Processing Methodology

The present invention provides a spoken natural language interface for interrogation of remote electronic databases and retrieval of desired information. A preferred embodiment of the present invention utilizes the basic methodology outlined in the flow diagram of FIG. 4 in order to provide this interface. This methodology will now be discussed.

a. Interpreting Spoken Natural Language Requests

At step 402, the user's spoken request for information is initially received in the form of raw (acoustic) voice data by a suitable input device, as previously discussed in connection with FIGS. 1–2. At step 404 the voice data received from the user is interpreted in order to understand the user's request for information. Preferably this step includes performing speech recognition in order to extract words from the voice data, and further includes natural language parsing of those words in order to generate a structured linguistic representation of the user's request.

Speech recognition in step 404 is performed using speech recognition engine 310. A variety of commercial quality, speech recognition engines are readily available on the market, as practitioners will know. For example, Nuance Communications offers a suite of speech recognition engines, including Nuance 6, its current flagship product, and Nuance Express, a lower cost package for entry-level applications. As one other example, IBM offers the ViaVoice speech recognition engine, including a low-cost shrink-wrapped version available through popular consumer distribution channels. Basically, a speech recognition engine processes acoustic voice data and attempts to generate a text stream of recognized words.

Typically, the speech recognition engine is provided with a vocabulary lexicon of likely words or phrases that the recognition engine can match against its analysis of acoustical signals, for purposes of a given application. Preferably, the lexicon is dynamically adjusted to reflect the current user context, as established by the preceding user inputs. For example, if a user is engaged in a dialogue with the system about movie selection, the recognition engine's vocabulary may preferably be adjusted to favor relevant words and phrases, such as a stored list of proper names for popular movie actors and directors, etc. Whereas if the current dialogue involves selection and viewing of a sports event, the engine's vocabulary might preferably be adjusted to favor a stored list of proper names for professional sports teams, etc. In addition, a speech recognition engine is provided with language models that help the engine predict the most likely interpretation of a given segment of acoustical voice data, in the current context of phonemes or words in which the segment appears. In addition, speech recognition engines often echo to the user, in more or less real-time, a transcription of the engine's best guess at what the user has said, giving the user an opportunity to confirm or reject.

In a further aspect of step 404, natural language interpreter (or parser) 320 linguistically parses and interprets the textual output of the speech recognition engine. In a preferred embodiment of the present invention, the natural-language interpreter attempts to determine both the meaning of spoken words (semantic processing) as well as the grammar of the statement (syntactic processing), such as the Gemini Natural Language Understanding System developed by SRI International. The Gemini system is described in detail in publications entitled "Gemini: A Natural Language System for Spoken-Language Understanding" and "Interleaving Syntax and Semantics in an Efficient Bottom-Up Parser," both of which are currently available online at http://www.ai.sri.com/natural-language/projects/arpa-sls/nat-lang.html. (Copies of those publications are also included in an information disclosure statement submitted herewith, and are incorporated herein by this reference). Briefly, Gemini applies a set of syntactic and semantic grammar rules to a word string using a bottom-up parser to generate a logical form, which is a structured representation of the context-independent meaning of the string. Gemini can be used with a variety of grammars, including general English grammar as well as application-specific grammars. The Gemini parser is based on "unification grammar," meaning that grammatical categories incorporate features that can be assigned values; so that when grammatical category expressions are matched in the course of parsing or semantic interpretation, the information contained in the features is combined, and if the feature values are incompatible the match fails.

It is possible for some applications to achieve a significant reduction in speech recognition error by using the natural-language processing system to re-score recognition hypotheses. For example, the grammars defined for a language parser like Gemini may be compiled into context-free grammar that, in turn, can be used directly as language models for speech recognition engines like the Nuance recognizer. Further details on this methodology are provided in the publication "Combining Linguistic and Statistical Knowledge Sources in Natural-Language Processing for ATIS" which is currently available online through http://www.ai.sri.com/natural-language/projects/arpa-sls/spnl-int.html. A copy of this publication is included in an information disclosure submitted herewith, and is incorporated herein by this reference.

In an embodiment of the present invention that may be preferable for some applications, the natural language interpreter "learns" from the past usage patterns of a particular user or of groups of users. In such an embodiment, the successfully interpreted requests of users are stored, and can then be used to enhance accuracy by comparing a current request to the stored requests, thereby allowing selection of a most probable result.

b. Constructing Navigation Queries

In step 405 request processing logic 300 identifies and selects an appropriate online data source where the desired information (in this case, current weather reports for a given city) can be found. Such selection may involve look-up in a locally stored table, or possibly dynamic searching through an online search engine, or other online search techniques. For some applications, an embodiment of the present invention may be implemented in which only access to a particular data source (such as a particular vendor's proprietary content database) is supported; in that case, step 405 may be trivial or may be eliminated entirely.

Step 406 attempts to construct a navigation query, reflecting the interpretation of step 404. This operation is preferably performed by query construction logic 330.

A "navigation query" means an electronic query, form, series of menu selections, or the like; being structured appropriately so as to navigate a particular data source of interest in search of desired information. In other words, a navigation query is constructed such that it includes whatever content and structure is required in order to access desired information electronically from a particular database or data source of interest.

For example, for many existing electronic databases, a navigation query can be embodied using a formal database query language such as Standard Query Language (SQL). For many databases, a navigation query can be constructed through a more user-friendly interactive front-end, such as a series of menus and/or interactive forms to be selected or filled in. SQL is a standard interactive and programming language for getting information from and updating a database. SQL is both an ANSI and an ISO standard. As is well known to practitioners, a Relational Database Management System (RDBMS), such as Microsoft's Access, Oracle's Oracle7, and Computer Associates' CA-OpenIngres, allow programmers to create, update, and administer a relational database. Practitioners of ordinary skill in the art will be thoroughly familiar with the notion of database navigation through structured query, and will be readily able to appreciate and utilize the existing data structures and navigational mechanisms for a given database, or to create such structures and mechanisms where desired.

In accordance with the present invention, the query constructed in step 406 must reflect the user's request as interpreted by the speech recognition engine and the NL parser in step 404. In embodiments of the present invention wherein data source 110 (or 210 in the corresponding embodiment of FIG. 2) is a structured relational database or the like, step 406 of the present invention may entail constructing an appropriate Structured Query Language (SQL) query or the like, or automatically filling out a front-end query form, series of menus or the like, as described above.

In many existing Internet (and Intranet) applications, an online electronic data source is accessible to users only through the medium of interaction with a so-called Common Gateway Interface (CGI) script. Typically the user who visits a web site of this nature must fill in the fields of an online interactive form. The online form is in turn linked to a CGI script, which transparently handles actual navigation of the associated data source and produces output for viewing by the user's web browser. In other words, direct user access to the data source is not supported, only mediated access through the form and CGI script is offered.

For applications of this nature, an advantageous embodiment of the present invention "scrapes" the scripted online site where information desired by a user may be found in order to facilitate construction of an effective navigation query. For example, suppose that a user's spoken natural language request is: "What's the weather in Miami?" After this request is received at step 402 and interpreted at step 404, assume that step 405 determines that the desired weather information is available online through the medium of a CGI-scripted interactive form. Step 406 is then preferably carried out using the expanded process diagrammed in FIG. 5. In particular, at sub-step 520, query construction logic 330 electronically "scrapes" the online interactive form, meaning that query construction logic 330 automatically extracts the format and structure of input fields accepted by the online form. At sub-step 522, a navigation query is then constructed by instantiating (filling in) the extracted input format—essentially an electronic template—in a manner reflecting the user's request for information as interpreted in step 404. The flow of control then returns to step 407 of FIG. 4. Ultimately, when the query thus constructed by scraping is used to navigate the online data source in step 408, the query effectively initiates the same scripted response as if a human user had visited the online site and had typed appropriate entries into the input fields of the online form.

In the embodiment just described, scraping step 520 is preferably carried out with the assistance of an online extraction utility such as WebL. WebL is a scripting language for automating tasks on the World Wide Web. It is an imperative, interpreted language that has built-in support for common web protocols like HTTP and FTP, and popular data types like HTML and XML. WebL's implementation language is Java, and the complete source code is available from Compaq. In addition, step 520 is preferably performed dynamically when necessary—in other words, on-the-fly in response to a particular user query—but in some applications it may be possible to scrape relatively stable (unchanging) web sites of likely interest in advance and to cache the resulting template information.

It will be apparent, in light of the above teachings, that preferred embodiments of the present invention can provide a spoken natural language interface atop an existing, non-voice data navigation system, whereby users can interact by means of intuitive natural language input not strictly conforming to the linear browsing architecture or other artifacts of an existing menu/text/click navigation system. For example, users of an appropriate embodiment of the present invention for a video-on-demand application can directly speak the natural request: "Show me the movie 'Unforgiven'"—instead of walking step-by-step through a typically linear sequence of genre/title/actor/director menus, scrolling and selecting from potentially long lists on each menu, or instead of being forced to use an alphanumeric keyboard that cannot be as comfortable to hold or use as a lightweight remote control. Similarly, users of an appropriate embodiment of the present invention for a web-surfing application in accordance with the process shown in FIG. 5 can directly speak the natural request: "Show me a one-month price chart for Microsoft stock"—instead of potentially having to navigate to an appropriate web site, search for the right ticker symbol, enter/select the symbol, and specify display of the desired one-month price chart, each of those steps potentially involving manual navigation and data entry to one or more different interaction screens. (Note that these examples are offered to illustrate some of the potential benefits offered by appropriate embodiments of the present invention, and not to limit the scope of the invention in any respect.)

c. Error Correction

Several problems can arise when attempting to perform searches based on spoken natural language input. As indicated at decision step 407 in the process of FIG. 4, certain deficiencies may be identified during the process of query construction, before search of the data source is even attempted. For example, the user's request may fail to specify enough information in order to construct a navigation query that is specific enough to obtain a satisfactory search result. For example, a user might orally request "what's the weather?" whereas the national online data source identified in step 405 and scraped in step 520 might require specifying a particular city.

Figure 4:
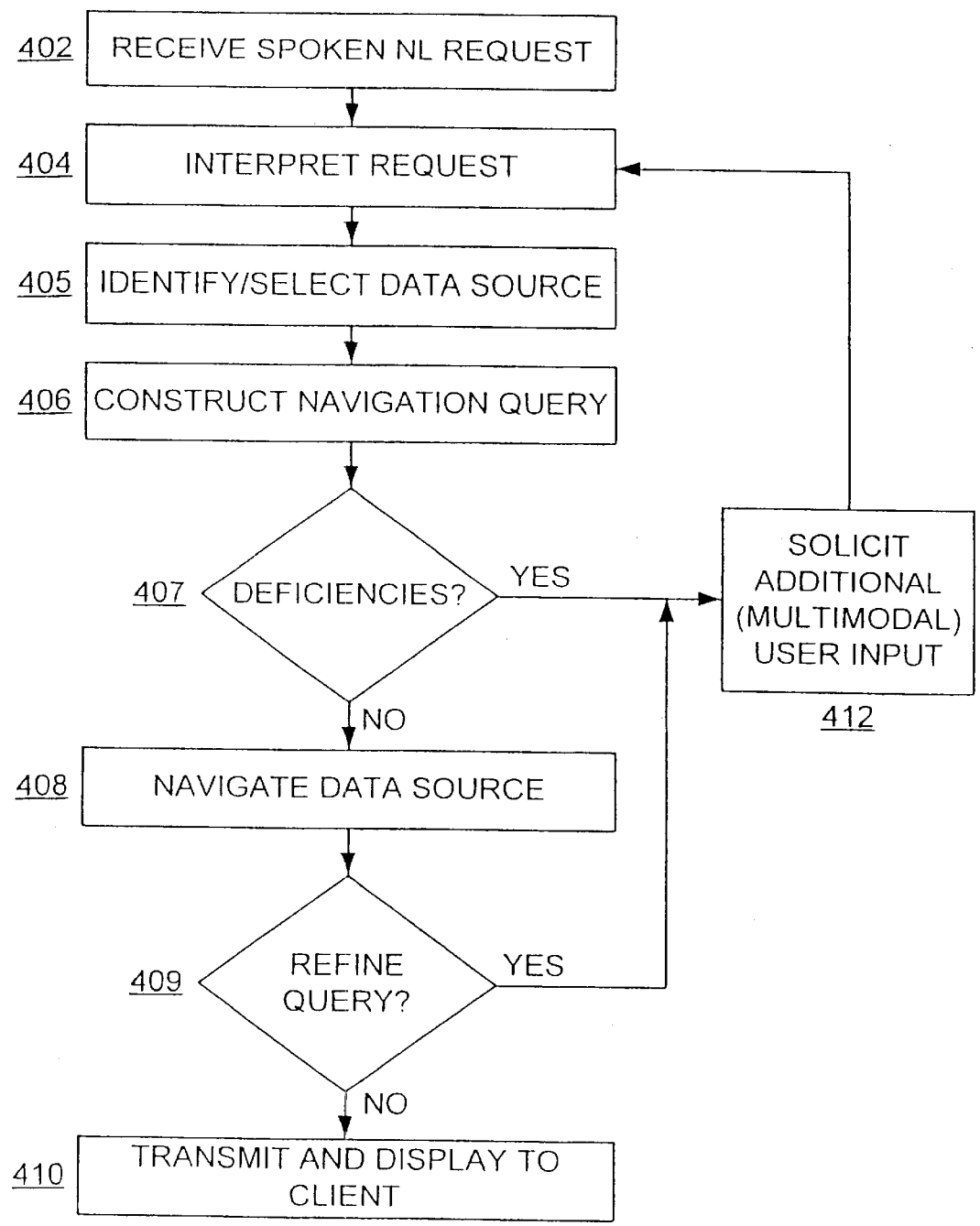
FIG. 4 illustrates a process utilizing spoken natural language for navigating an electronic database in accordance with one embodiment of the present invention.
Figure 5:
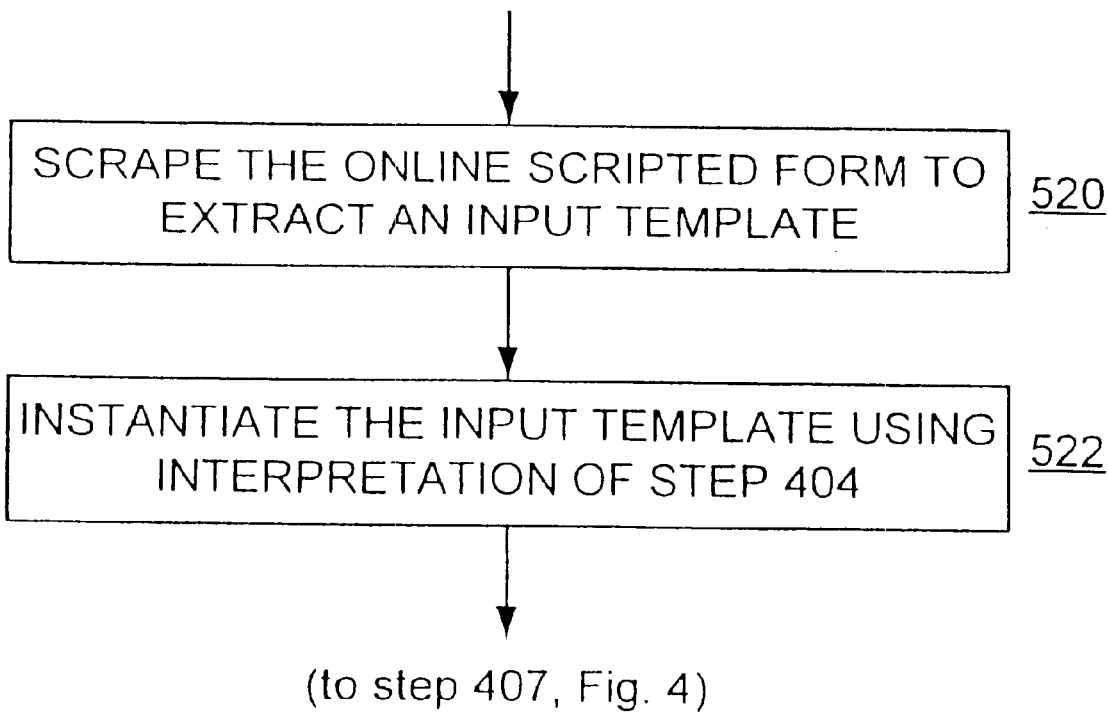
FIG. 5 illustrates a process for constructing a navigational query for accessing an online data source via an interactive, scripted (e.g., CGI) form.

Additionally, certain deficiencies and problems may arise following the navigational search of the data source at step 408, as indicated at decision step 409 in FIG. 4. For example, with reference to a video-on-demand application, a user may wish to see the movie "Unforgiven", but perhaps the user can't recall name of the film, but knows it was directed by and starred actor Clint Eastwood. A typical video-on-demand database might indeed be expected to allow queries specifying the name of a leading actor and/or director, but in the case of this query—as in many cases—that will not be enough to narrow the search to a single film, and additional user input in some form is required.

In the event that one or more deficiencies in the user's spoken request, as processed, result in the problems described, either at step 407 or 409, some form of error handling is in order. A straightforward, crude technique might be for the system to respond simply "input not understood/insufficient; please try again." However, that approach will likely result in frustrated users, and is not optimal or even acceptable for most applications. Instead, a preferred technique in accordance with the present invention handles such errors and deficiencies in user input at step 412, whether detected at step 407 or step 409, by soliciting additional input from the user in a manner taking advantage of the partial construction already performed and via user interface modalities in addition to spoken natural language ("multi-modality"). This supplemental interaction is preferably conducted through client display device 112 (202, in the embodiment of FIG. 2), and may include textual, graphical, audio and/or video media. Further details and examples are provided below. Query refinement logic 340 preferably carries out step 412. The additional input received from the user is fed into and augments interpreting step 404, and query construction step 406 is likewise repeated with the benefit of the augmented interpretation. These operations, and subsequent navigation step 408, are preferably repeated until no remaining problems or deficiencies are identified at decision points 407 or 409. Further details and examples for this query refinement process are provided immediately below.

Consider again the example in which the user of a video-on-demand application wishes to see "Unforgiven" but can only recall that it was directed by and starred Clint Eastwood. First, it bears noting that using a prior art navigational interface, such as a conventional menu interface, will likely be relatively tedious in this case. The user can proceed through a sequence of menus, such as Genre (select "western"), Title (skip), Actor ("Clint Eastwood"), and Director ("Clint Eastwood"). In each case—especially for the last two items—the user would typically scroll and select from fairly long lists in order to enter his or her desired name, or perhaps use a relatively couch-unfriendly keypad to manually type the actor's name twice.

Using a preferred embodiment of the present invention, the user instead speaks aloud, holding remote control microphone 102, "I want to see that movie starring and directed by Clint Eastwood. Can't remember the title." At step 402 the voice data is received. At step 404 the voice data is interpreted. At step 405 an appropriate online data source is selected (or perhaps the system is directly connected to a proprietary video-on-demand provider). At step 406 a query is automatically constructed by the query construction logic 330 specifying "Clint Eastwood" in both the actor and director fields. Step 407 detects no obvious problems, and so the query is electronically submitted and the data source is navigated at step 408, yielding a list of several records satisfying the query (e.g., "Unforgiven", "True Crime", "Absolute Power", etc.). Step 409 detects that additional user input is needed to further refine the query in order to select a particular film for viewing.

At that point, in step 412 query refinement logic 340 might preferably generate a display for client display device 112 showing the (relatively short) list of film titles that satisfy the user's stated constraints. The user can then preferably use a relatively convenient input modality, such as buttons on the remote control, to select the desired title from the menu. In a further preferred embodiment, the first title on the list is highlighted by default, so that the user can simply press an "OK" button to choose that selection. In a further preferred feature, the user can mix input modalities by speaking a response like "I want number one on the list." Alternatively, the user can preferably say, "Let's see Unforgiven," having now been reminded of the title by the menu display.

Utilizing the user's supplemental input, request processing logic 300 iterates again through steps 404 and 406, this time constructing a fully-specified query that specifically requests the Eastwood film "Unforgiven." Step 408 navigates the data source using that query and retrieves the desired film, which is then electronically transmitted in step 410 from network server 108 to client display device 112 via communications network 106.

Now consider again the example in which the user of a web surfing application wants to know his or her local weather, and simply asks, "what's the weather?" At step 402 the voice data is received. At step 404 the voice data is interpreted. At step 405 an online web site providing current weather information for major cities around the world is selected. At step 406 and sub-step 520, the online site is scraped using a WebL-style tool to extract an input template for interacting with the site. At sub-step 522, query construction logic 330 attempts to construct a navigation query by instantiating the input template, but determines (quite rightly) that a required field—name of city—cannot be determined from the user's spoken request as interpreted in step 404. Step 407 detects this deficiency, and in step 412 query refinement logic 340 preferably generates output for client display device 112 soliciting the necessary supplemental input. In a preferred embodiment, the output might display the name of the city where the user is located highlighted by default. The user can then simply press an "OK" button—or perhaps mix modalities by saying "yes, exactly"—to choose that selection. A preferred embodiment would further display an alphabetical scrollable menu listing other major cities, and/or invite the user to speak or select the name of the desired city.

Here again, utilizing the user's supplemental input, request processing logic 300 iterates through steps 404 and 406. This time, in performing sub-step 520, a cached version of the input template already scraped in the previous iteration might preferably be retrieved. In sub-step 522, query construction logic 330 succeeds this time in instantiating the input template and constructing an effective query, since the desired city has now been clarified. Step 408 navigates the data source using that query and retrieves the desired weather information, which is then electronically transmitted in step 410 from network server 108 to client display device 112 via communications network 106.

It is worth noting that in some instances, there may be details that are not explicitly provided by the user, but that query construction logic 330 or query refinement logic 340 may preferably deduce on their own through reasonable assumptions, rather than requiring the use to provide explicit clarification. For example, in the example previously described regarding a request for a weather report, in some applications it might be preferable for the system to simply assume that the user means a weather report for his or her home area and to retrieve that information, if the cost of doing so is not significantly greater than the cost of asking the user to clarify the query. Making such an assumption might be even more strongly justified in a preferred embodiment, as described earlier, where user histories are tracked, and where such history indicates that a particular user or group of users typically expect local information when asking for a weather forecast. At any rate, in the event such an assumption is made, if the user actually intended to request the weather for a different city, the user would then need to ask his or her question again. It will be apparent to practitioners, in light of the above teachings, that the choice of whether to program query construction logic 330 and query refinement logic 340 to make particular assumptions will typically involve trade-offs involving user convenience that can be assessed in the context of specific applications.

3. Open Agent Architecture (OAA®)

Open Agent Architecture™ (OAA®) is a software platform, developed by the assignee of the present invention, that enables effective, dynamic collaboration among communities of distributed electronic agents. OAA is described in greater detail in co-pending U.S. patent application Ser. No. 09/225,198, which has been incorporated herein by reference. Very briefly, the functionality of each client agent is made available to the agent community through registration of the client agent's capabilities with a facilitator. A software "wrapper" essentially surrounds the underlying application program performing the services offered by each client. The common infrastructure for constructing agents is preferably supplied by an agent library. The agent library is preferably accessible in the runtime environment of several different programming languages. The agent library preferably minimizes the effort required to construct a new system and maximizes the ease with which legacy systems can be "wrapped" and made compatible with the agent-based architecture of the present invention. When invoked, a client agent makes a connection to a facilitator, which is known as its parent facilitator. Upon connection, an agent registers with its parent facilitator a specification of the capabilities and services it can provide, using a highlevel, declarative Interagent Communication Language ("ICL") to express those capabilities. Tasks are presented to the facilitator in the form of ICL goal expressions. When a facilitator determines that the registered capabilities of one of its client agents will help satisfy a current goal or sub-goal thereof, the facilitator delegates that subgoal to the client agent in the form of an ICL request. The client agent processes the request and returns answers or information to the facilitator. In processing a request, the client agent can use ICL to request services of other agents, or utilize other infrastructure services for collaborative work. The facilitator coordinates and integrates the results received from different client agents on various sub-goals, in order to satisfy the overall goal.

OAA provides a useful software platform for building systems that integrate spoken natural language as well as other user input modalities. For example, see the above-referenced co-pending patent application, especially FIG. 13 and the corresponding discussion of a "multi-modal maps" application, and FIG. 12 and the corresponding discussion of a "unified messaging" application. Another example is the InfoWiz interactive information kiosk developed by the assignee and described in the document entitled "InfoWiz: An Animated Voice Interactive Information System" available online at http://www.ai.sri.com/~oaa/applications.html. A copy of the InfoWhiz document is provided in an Information Disclosure Statement submitted herewith and incorporated herein by this reference. A further example is the "CommandTalk" application developed by the assignee for the U.S. military, as described online at http://www.ai.sri.com/~lesaf/commandtalk.html and in the following publications, copies of which are provided in an Information Disclosure Statement submitted herewith and incorporated herein by this reference:

"CommandTalk: A Spoken-Language Interface for Battlefield Simulations", 1997, by Robert Moore, John Dowding, Harry Bratt, J. Mark Gawron, Yonael Gorfu and Adam Cheyer, in "Proceedings of the Fifth Conference on Applied Natural Language Processing", Washington, DC, pp. 1–7, Association for Computational Linguistics "The CommandTalk Spoken Dialogue System", 1999, by Amanda Stent, John Dowding, Jean Mark Gawron, Elizabeth Owen Bratt and Robert Moore, in "Proceedings of the Thirty-Seventh Annual Meeting of the ACL", pp. 183–190, University of Maryland, College Park, Md., Association for Computational Linguistics "Interpreting Language in Context in CommandTalk", 1999, by John Dowding and Elizabeth Owen Bratt and Sharon Goldwater, in "Communicative Agents: The Use of Natural Language in Embodied Systems", pp. 63–67, Association for Computing Machinery (ACM) Special Interest Group on Artificial Intelligence (SIGART), Seattle, Wash.

Figure 6:
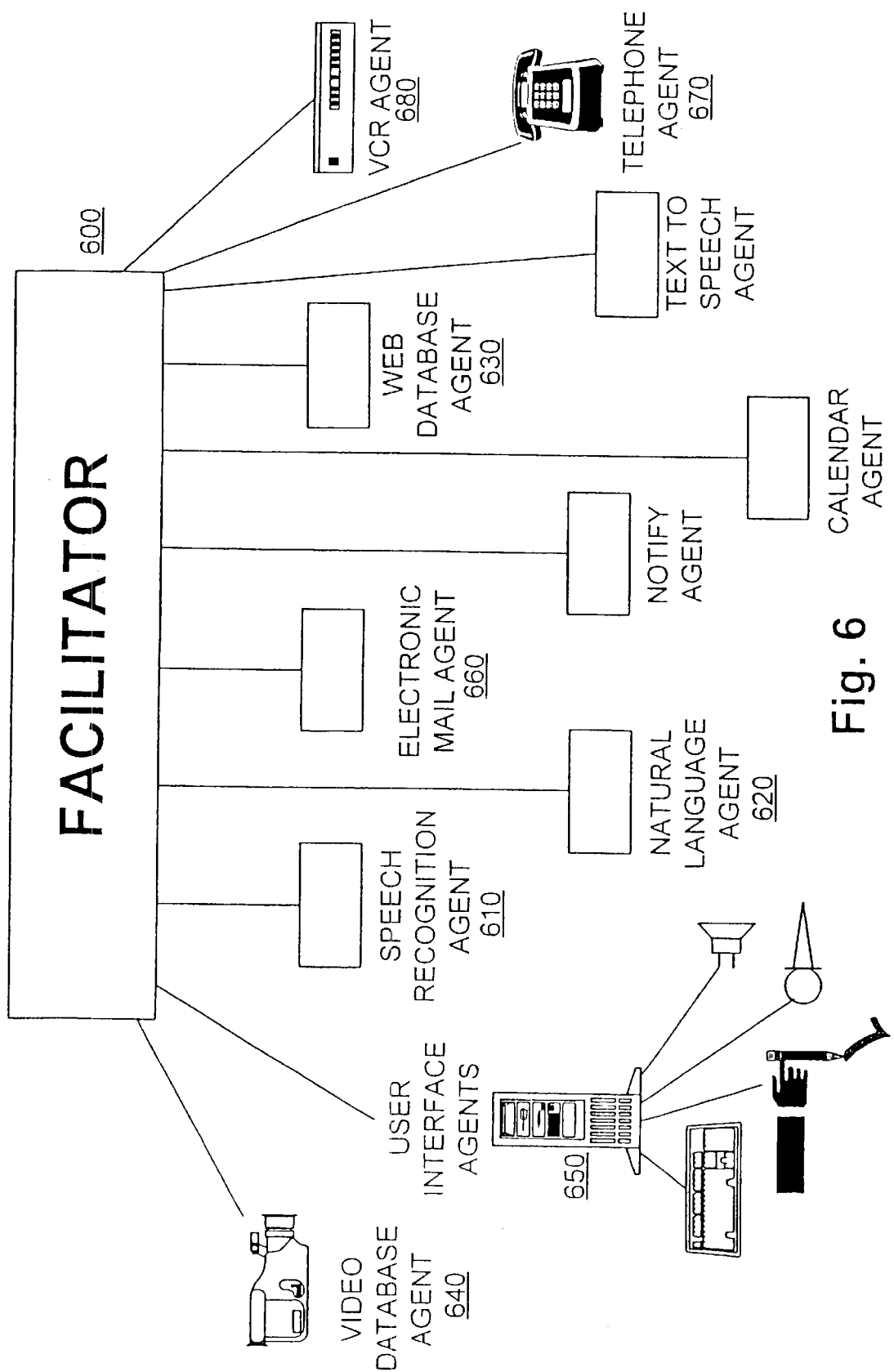
FIG. 6 illustrates an embodiment of the present invention utilizing a community of distributed, collaborating electronic agents.

For some applications and systems, OAA can provide an advantageous platform for constructing embodiments of the present invention. For example, a representative application is now briefly presented, with reference to FIG. 6. If the statement "show me movies starring John Wayne" is spoken into the voice input device, the voice data for this request will be sent by UI agent 650 to facilitator 600, which in turn will ask natural language (NL) agent 620 and speech recognition agent 610 to interpret the query and return the interpretation in ICL format. The resulting ICL goal expression is then routed by the facilitator to appropriate agents—in this case, video-on-demand database agent 640—to execute the request. Video database agent 640 preferably includes or is coupled to an appropriate embodiment of query construction logic 330 and query refinement logic 340, and may also issue ICL requests to facilitator 600 for additional assistance—e.g., display of menus and capture of additional user input in the event that query refinement is needed—and facilitator 600 will delegate such requests to appropriate client agents in the community. When the desired video content is ultimately retrieved by video database agent 640, UI agent 650 is invoked by facilitator 600 to display the movie.

Other spoken user requests, such as a request for the current weather in New York City or for a stock quote, would eventually lead facilitator to invoke web database agent 630 to access the desired information from an appropriate Internet site. Here again, web database agent 630 preferably includes or is coupled to an appropriate embodiment of query construction logic 330 and query refinement logic 340, including a scraping utility such as WebL. Other spoken requests, such as a request to view recent emails or access voice mail, would lead the facilitator to invoke the appropriate email agent 660 and/or telephone agent 680. A request to record a televised program of interest might lead facilitator 600 to invoke web database agent 630 to return televised program schedule information, and then invoke VCR controller agent 680 to program the associated VCR unit to record the desired television program at the scheduled time.

Control and connectivity embracing additional electronic home appliances (e.g., microwave oven, home surveillance system, etc.) can be integrated in comparable fashion. Indeed, an advantage of OAA-based embodiments of the present invention, that will be apparent to practitioners in light of the above teachings and in light of the teachings disclosed in the cited co-pending patent applications, is the relative ease and flexibility with which additional service agents can be plugged into the existing platform, immediately enabling the facilitator to respond dynamically to spoken natural language requests for the corresponding services.

4. Further Embodiments and Equivalents

While the present invention has been described in terms of several preferred embodiments, there are many alterations, permutations, and equivalents that may fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for speech-based navigation of an electronic data source, the electronic data source being located at one or more network servers located remotely from a user, comprising the steps of:
   (a) receiving a spoken request for desired information from the user;
   (b) rendering an interpretation of the spoken request;
   (c) constructing at least part of a navigation query based upon the interpretation;
   (d) soliciting additional input from the user, including user interaction in a non-spoken modality different than the original request without requiring the user to request said non-spoken modality;
   (e) refining the navigation query, based upon the additional input;
   (f) using the refined navigation query to select a portion of the electronic data source; and
   (g) transmitting the selected portion of the electronic data source from the network server to a client device of the user.

2. The method of claim 1, wherein the step of rendering an interpretation further includes deriving linguistic information by using a speech recognition engine and a linguistic parser.

3. The method of claim 1, wherein the step of constructing a navigation query further includes the steps of extracting an input template for an online scripted interface to the data source, and using the input template to construct the navigation query.

4. The method of claim 3, wherein the step of extracting the input template includes dynamically scraping the online scripted interface.

5. The method of claim 1, wherein the navigation query is constructed in the format of a database query language.

6. The method of claim 1, wherein the step of rendering an interpretation and the step of constructing a navigation query are performed, at least in part, on a computing device located locally with the user.

7. The method of claim 1, wherein the step of rendering an interpretation and the step of constructing a navigation query are performed, at least in part, on a network computing device located remotely from the user.

8. The method of claim 1, wherein the step of soliciting additional input is performed in response to one or more deficiencies encountered during the step of constructing a navigation query.

9. The method of claim 8, wherein the deficiencies include unresolved words of the spoken request.

10. The method of claim 8, wherein the deficiencies include one or more required elements of the navigational query not determinable from the interpretation of the spoken request.

11. The method of claim 1, wherein the step of soliciting additional input is performed in response to one or more deficiencies encountered after a first navigation of the data source using the navigation query constructed in step (c).

12. The method of claim 11, wherein the deficiencies include existence of more than one data record within the data source responsive to the navigation query.

13. The method of claim 11, wherein the deficiencies include failure to identify a single data record within the data source responsive to the navigation query.

14. The method of claim 1, wherein the additional input is solicited upon receiving a user-input statement that additional information is required.

15. The method of claim 1, wherein the step of soliciting the additional input includes presenting a menu to the user on the client device of the user.

16. The method of claim 1, wherein the step of soliciting the additional input includes presenting a textual request for the additional input.

17. The method of claim 1, wherein the step of soliciting the additional input includes an audible request for the additional input.

18. The method of claim 1, wherein the step of soliciting the additional input includes presenting a list of portions of the electronic data source that match the navigational query.

19. The method of claim 1, wherein additional input received from the user is at least partially speech based.

20. The method of claim 1, wherein additional input received from the user includes no spoken input.

21. The method of claim 1, wherein steps (d)–(e) are repeated until the navigational query is deemed adequate.

22. The method of claim 1, wherein the input modality of step (d) includes selecting from a displayed option menu.

23. The method of claim 22, wherein the act of selecting from the displayed option menu is performed by speaking.

24. The method of claim 1, wherein the method is performed with respect to a plurality of simultaneous users and corresponding client devices.

25. The method of claim 1, further including the step of selecting the data source from among a plurality of candidate electronic data sources, in response to the interpretation of the spoken request.

26. The method of claim 1, wherein the electronic data source stores multimedia content including at least one of video content and audio content.

27. A system for speech-based navigation of an electronic data source, the electronic data source being located at one or more network servers located remotely from a user, the system comprising:
   (a) a portable microphone operable to receive a spoken request for desired information from the user;
   (b) language processing logic, operable to render an interpretation of the spoken request;
   (c) query construction logic, operable to construct a navigation query in response to the interpretation of the spoken request;
   (d) user interaction logic, operable to solicit additional input from the user, including user interaction in a non-spoken modality different than the original request without requiring the user to request said non-spoken modality;
   (e) query refining logic, operable to refine the navigation query, based upon the additional input;
   (f) navigation logic, operable to select a portion of the electronic data source using the navigation query; and
   (g) electronic communications infrastructure for transmitting the selected portion of the electronic data source from the network server to a primarily stationary, display device located locally with the user.

28. The system of claim 27, wherein the language processing logic includes speech recognition logic and an linguistic parsing logic for deriving linguistic information.

29. The system of claim 27, wherein the language processing logic extracts an input template for an online scripted interface to the data source, and uses the input template to construct the navigation query.

30. The system of claim 29, wherein the language processing logic dynamically scrapes the online scripted interface.

31. The system of claim 27, wherein the query construction logic constructs the query in the format of a database query language.

32. The system of claim 27, wherein at least a portion of the language processing logic is hosted on a computing device located locally with the user, and wherein the portable microphone is electronically coupled to the local computing device.

33. The system of claim 27, wherein at least a portion of the language processing logic is hosted on a network computing device located remotely from the user, and wherein the portable microphone sends data to the remote network computing device via the communications infrastructure.

34. The system of claim 27, wherein the user interaction logic solicits additional input in response to one or more deficiencies encountered during construction of the navigation query.

35. The system of claim 34, wherein the deficiencies include unresolved words of the spoken request.

36. The system of claim 34, wherein the deficiencies include one or more required elements of the navigational query not determinable from the interpretation of the spoken request.

37. The system of claim 27, wherein the user interaction logic solicits additional input in response to one or more deficiencies encountered after a first navigation of the data source performed by the navigation logic.

38. The system of claim 31, wherein the deficiencies include existence of more than one date record within the data source responsive to the navigation query.

39. The system of claim 31, wherein the deficiencies include failure to identify a single data record within the data source responsive to the navigation query.

40. The system of claim 27, wherein the user Interaction logic displays an option menu.

41. The system of claim 40, wherein the act of selecting from the displayed option menu is performed by speaking.

42. The system of claim 27, wherein the navigation logic selects the data source from among a plurality of candidate electronic data sources, in response to the interpretation of the spoken request.

43. The system of claim 27, wherein the electronic data source stores multimedia content including at least one of video content and audio content.

44. The system of claim 27, wherein the display device receives data from the electronic data source on the network servers via a communications box.

45. The system of claim 27, wherein the electronic communication infrastructure is a two-way infrastructure and is selected from among one or more of the following group: {coaxial cable, DSL, satellite, wireless/cellular, fiberoptic}.

46. A computer program embodied on a computer readable medium for speech-based navigation of an electronic data source, the electronic data source being located at one or more network servers located remotely from a user, comprising:

(a) a code segment that receives a spoken request for desired information from the user;

(b) a code segment that renders an interpretation of the spoken request;

(c) a code segment that constructs at least part of a navigation query based upon the interpretation;

(d) a code segment that solicits additional input from the user, including user interaction in a non-spoken modality different than the original request without requiring the user to request said non-spoken modality;

(e) a code segment that refines the navigation query, based upon the additional input;

(f) a code segment that uses the refined navigation query to select a portion of the electronic data source; and (g) a code segment that transmits the selected portions of the electronic data source from the network server to a primarily stationary, display device located locally with the user.

47. The computer program of claim 46, further comprising a code segment that derives linguistic information by using a speech recognition engine and a linguistic parser.

48. The computer program of claim 46, further comprising a code segment that extract an input template for an online scripted interface to the data source, and a code segment that uses the input template to construct the navigation query.

49. The computer program of claim 48, further comprising a code segment that dynamically scrapes the online scripted interface.

50. The computer program of claim 46, wherein the navigation query is constructed in the format of a database query language.

51. The computer program of claim 46, wherein rendering of the interpretation and the construction of the navigation query are performed, at least in part, on a computing device located locally with the user.

52. The compute program of claim 46, wherein the rendering of the interpretation and the construction of a navigation query are performed, at least in part, on a network computing device located remotely from the user.

53. The computer program of claim 46, wherein code segment that solicits additional input solicits the additional input in response to one or more deficiencies encountered during the constructing of the navigation query.

54. The computer program of claim 53, wherein the deficiencies include unresolved words of the spoken request.

55. The computer program of claim 53, wherein the deficiencies include one or more required elements of the navigational query not determinable from the interpretation of the spoken request.

56. The computer program of claim 46, wherein the code segment that solicits the additional input solicits the additional input in response to one or more deficiencies encountered after a first navigation of the data source.

57. The computer program of claim 56, wherein the deficiencies include existence of more than one data record within the data source responsive to the navigation query.

58. The computer program of claim 57, wherein the deficiencies include failure to identify a single data record within the data source responsive to the navigation query.

59. The computer program of claim 46, wherein code segment that solicits additional Input displays an option menu.

60. The computer program of claim 59, wherein the act of selecting from the displayed option menu is performed by speaking.

61. The computer program of claim 46, wherein the code segments of the computer program operate with respect to a plurality of simultaneous users and corresponding client devices.

62. The computer program of claim 46, further comprising a code segment that selects the data source from among a plurality of candidate electronic data sources, in response to the interpretation of the spoken request.

63. The computer program of claim 46, wherein the electronic data source stores multimedia content including at least one of video content and audio content.

64. The computer program of claim 46, wherein the additional input is solicited upon receiving a user-input statement that additional information is required.

65. The computer program of claim 46, wherein the code segment that solicits the additional input includes a code segment that presents a menu to the user on the client device of the user.

66. The computer program of claim 46, wherein the code segment that solicits the additional input includes a code segment that presents a textual request for the additional input.

67. The computer program of claim 46, wherein the code segment that solicits the additional input includes a code segment that produces an audible request for the additional input.

68. The computer program of claim 46, wherein the code segment that solicits the additional input includes a code segment that presents a list of portions of the electronic data source that match the navigational query.

69. The computer program of claim 46, wherein additional input received from the user is at least partially speech based.

70. The computer program of claim 46, wherein additional input received from the user includes no spoken input.

71. The compute program of claim 46, wherein code segments (d)–(e) are repeated until the navigational query is deemed adequate.

72. A method for utilizing spoken natural language for navigating an electronic data source, the electronic data source being located at one or more network servers located remotely from a user; comprising the steps of:
(a) receiving a spoken natural language ("NL") request for desired information from the user;
(b) rendering an interpretation of the spoken request;
(c) constructing at least part of a navigation query based upon the interpretation;
(d) soliciting additional input from the user, including user interaction in a non-spoken modality different than the original request without requiring the user to request said non-spoken modality;
(e) refining the navigation query, based upon the additional input;
(f) using the refined navigation query to select a portion of the electronic data source; and
(g) transmitting the selected portion of the electronic data source from the network server to a client device,of the user.

73. The method of claim 72, wherein the step of rendering an interpretation further includes deriving linguistic information by using a speech recognition engine and an NL parser.

74. The method of claim 72, wherein the step of constructing a navigation query further includes the steps of extracting an input template for an online scripted interface to the data source, and using the input template to construct the navigation query.

75. The method of claim 74, wherein the step of extracting an input template includes dynamically scraping the online scripted interface.

76. The method of claim 72, wherein the navigation query is constructed in the format of a database query language.

77. The method of claim 72, wherein the step of rendering an interpretation and the step of constructing a navigation query are performed, at least in part, on a computing device located locally with the user.

78. The method of claim 72, wherein the step of rendering an interpretation and the step of constructing a navigation query are performed, at least in part, on a network computing device located remotely from the user.

79. The method of claim 72, wherein the step of soliciting additional input is performed in response to one or more deficiencies encountered during the step of constructing a navigation query.

80. The method of claim 79, wherein the deficiencies include unresolved words of the spoken NL request.

81. The method of claim 79, wherein the deficiencies include one or more required elements of the navigational query not determinable from the interpretation of the spoken NL request.

82. The method of claim 72, wherein the step of soliciting additional input is performed in response to one or more deficiencies encountered after a first navigation of the data source using the navigation query constructed in step (c).

83. The method of claim 82, wherein the deficiencies include existence of more than one data record within the data source responsive to the navigation query.

84. The method of claim 82, wherein the deficiencies include failure to identify a single data record within the data source responsive to the navigation query.

85. The method of claim 72, wherein the input modality of step (d) includes selecting from a displayed option menu.

86. The method of claim 85, wherein the act of selecting from the displayed option menu is performed by speaking.

87. The method of claim 72, wherein the method is performed with respect to a plurality of simultaneous users and corresponding client devices.

88. The method of claim 72, further including the step of selecting the data source from among a plurality of candidate electronic data sources, in response to the interpretation of the spoken NL request.

89. The method of claim 72, wherein the electronic data source stores multimedia content including at least one of video content and audio content.

90. A system or utilizing spoken natural language to navigate an electronic data source, the electronic data source being located at one or more network servers located remotely from a user, the system comprising:
(a) a portable microphone operable to receive a spoken natural language ("NL") request for desired information from the user;
(b) spoken language processing logic, operable to render an interpretation of the spoken natural language request;
(c) query construction logic, operable to construct a navigation query in response to the interpretation of the spoken natural language request;
(d) user interaction logic, operable to solicit additional input from the user, including user interaction in a non-spoken modality different than the original request without requiring the user to request said non-spoken modality;
(e) query refining logic, operable to refine the navigation query, based upon the additional input;

(f) navigation logic, operable to select a portion of the electronic data source using the navigation query; and (g) electronic communications infrastructure for transmitting the selected portion of the electronic data source from the network server to a primarily stationary, display device located locally with the user.

91. The system of claim 90, wherein the spoken language processing logic includes speech recognition logic and an NL parsing logic for deriving linguistic information.

92. The system of claim 90, wherein the spoken language processing logic extracts an input template for an online scripted interface to the data source, and uses the input template to construct the navigation query.

93. The system of claim 90, wherein the spoken language processing logic dynamically scrapes the online scripted interface.

94. The system of claim 90, wherein the query construction logic constructs the query in the format of a database query language.

95. The system of claim 90, wherein at least a portion of the spoken language processing logic is hosted on a computing device located locally with the user, and wherein the portable microphone is electronically coupled to the local computing device.

96. The system of claim 90, wherein at least a portion of the spoken language processing logic is hosted on a network computing device located remotely from the user, and wherein the portable microphone sends data to the remote network computing device via the communications infrastructure.

97. The system of claim 90, wherein the user interaction logic solicits additional input in response to one or more deficiencies encountered during construction of the navigation query.

98. The system of claim 97, wherein the deficiencies include unresolved words of the spoken NL request.

99. The system of claim 97, wherein the deficiencies include one or more required elements of the navigational query not determinable from the interpretation of the spoken NL request.

100. The system of claim 90, wherein the user interaction logic solicits additional input in response to one or more deficiencies encountered after a first navigation of the data source performed by the navigation logic.

101. The system of claim 100, wherein the deficiencies include existence of more than one data record within the data source responsive to the navigation query.

102. The system of claim 100, wherein the deficiencies include failure to identify a single data record within the data source responsive to the navigation query.

103. The system of claim 100, wherein the user interaction logic displays an option menu.

104. The system of claim 103, wherein the act of selecting from the displayed option menu is performed by speaking.

105. The system of claim 90, wherein the navigation logic selects the data source from among a plurality of candidate electronic data sources, in response to the interpretation of the spoken NL request.

106. The system of claim 90, wherein the electronic data source stores multimedia content including at least one of video content and audio content.

107. The system of claim 90, wherein the display device receives data from the electronic data source on the network servers via a communications box.

108. The system of claim 90, wherein the electronic communication infrastructure is a two-way infrastructure and is selected from among one or more of the following group: {coaxial cable, DSL, satellite, wireless/cellular, fiber-optic}.

109. A computer program embodied on a computer readable medium for utilizing spoken natural language for navigating an electronic data source, the electronic data source being located at one or more network servers located remotely from a user, comprising:

(a) a code segment that receives a spoken natural language ("NL") request for desired information from the user;

(b) a code segment that renders an interpretation of the spoken natural language request, (c) a code segment that constructs at least part of a navigation query based upon the interpretation;

(d) a code segment that solicits additional input from the user, including user interaction in a non-spoken modality different than the original request without requiring the user to request said non-spoken modality;

(e) a code segment that refines the navigation query, based upon the additional inputs;

(f) a code segment that uses the refined navigation query to select a portion of the electronic data source; and (g) a code segment that transmits the selected portion of the electronic data source from the network server to a primarily stationary, display device located locally with the user.

110. The computer program of claim 109, further comprising a code segment that derives linguistic information by using a speech recognition engine and an NL parser.

111. The computer program of claim 109, further comprising a code segment that extract an input template for an online scripted interface to the data source, and a code segment that uses the input template to construct the navigation query.

112. The computer program of claim 111, further comprising a code segment that dynamically scrapes the online scripted interface.

113. The computer program of claim 109, wherein the navigation query is constructed in the format of a database query language.

114. The computer program of claim 109, wherein rendering of the interpretation and the construction of the navigation query are performed, at least in part, on a computing device located locally with the user.

115. The computer program of claim 109, wherein the rendering of the interpretation and the construction of a navigation query are performed, at least in part, on a network computing device located remotely from the user.

116. The computer program of claim 109, wherein code segment that solicits additional input solicits the additional input in response to one or more deficiencies encountered during the constructing of the navigation query.

117. The computer program of claim 116, wherein the deficiencies include unresolved words of the spoken NL request.

118. The computer program of claim 116, wherein the deficiencies include one or more required elements of the navigational query not determinable from the interpretation of the spoken NL request.

119. The computer program of claim 109, wherein the code segment that solicits the additional input solicits the additional input in response to one or more deficiencies encountered after a first navigation of the data source.

120. The computer program of claim 119, wherein the deficiencies include existence of more than one data record within the data source responsive to the navigation query.

121. The computer program of claim 119, wherein the deficiencies include failure to identify a single data record within the data source responsive to the navigation query.

122. The computer program of claim 109, wherein code segment that solicits additional input displays an option menu.

123. The computer program of claim 122, wherein the act of selecting from the displayed option menu is performed by speaking.

124. The computer program of claim 109, wherein the code segments of the computer program operate with respect to a plurality of simultaneous users and corresponding client devices.

125. The computer program of claim 109, further comprising a code segment that selects the data source from among a plurality of candidate electronic data sources, in response to the interpretation of the spoken NL request.

126. The computer program of claim 109, wherein the electronic data source stores multimedia content including at least one of video content and audio content.

127. A method for utilizing spoken natural language for navigating an electronic data source, the electronic data source being located at one or more network servers located remotely from a user, comprising the steps of:

(a) receiving a spoken natural language ("NL") request for desired information from the user;

(b) rendering an interpretation of the spoken request;

(c) constructing at least part of a navigation query based upon the interpretation;

(d) soliciting additional input from the user, including user interaction in a non-spoken modality different than the original request, in accordance with results generated from said at least part of a navigation query;

(e) refining the navigation query, based upon the additional input;

(f) using the refined navigation query to select a portion of the electronic data source; and (g) transmitting the selected portion of the electronic data source from the network server to a client device of the user.

128. The method of claim 127, wherein the input modality of step (d) includes selecting from a displayed option menu.

129. The method of claim 128, wherein the act of selecting from the displayed option menu is performed by speaking.

130. A method for utilizing spoken natural language for navigating an electronic data source, the electronic data source being located at one or more network servers located remotely from a user, comprising the steps of:

(a) receiving a spoken natural language ("NL") request for desired information from the user;

(b) rendering an interpretation of the spoken request;

(c) constructing at least part of a navigation query based upon the interpretation;

(d) soliciting additional input from the user, including user interaction in a non-spoken modality different than the original request, in response to one or more deficiencies encountered during the step of constructing said at least part of a navigation query;

(e) refining the navigation query, based upon the additional input;

(f) using the refined navigation query to select a portion of the electronic data source; and (g) transmitting the selected portion of the electronic data source from the network server to a client device of the user.

131. The method of claim 130, wherein the input modality of step (d) includes selecting from a displayed option menu.

132. The method of claim 131, wherein the act of selecting from the displayed option menu is performed by speaking.

* * * * *